United States Patent
Pike et al.

(10) Patent No.: US 6,776,042 B2
(45) Date of Patent: Aug. 17, 2004

(54) MICRO-MACHINED ACCELEROMETER

(75) Inventors: William Thomas Pike, London (GB); Ian Maxwell Standley, Claremont, CA (US); Amadej Trnkoczy, Bovec (SI)

(73) Assignee: Kinemetrics, Inc., Pasadena, CA (US)

(*) Notice: Subject to any disclaimer, the term of this patent is extended or adjusted under 35 U.S.C. 154(b) by 64 days.

(21) Appl. No.: 10/058,210

(22) Filed: Jan. 25, 2002

(65) Prior Publication Data

US 2003/0140699 A1 Jul. 31, 2003

(51) Int. Cl.[7] .............................................. G01P 15/125
(52) U.S. Cl. ................................. 73/514.32; 73/514.16; 73/514.24
(58) Field of Search ......................... 73/514.32, 514.01, 73/514.16, 514.23, 514.24, 514.21

(56) References Cited

U.S. PATENT DOCUMENTS

| | | |
|---|---|---|
| 4,280,206 A | 7/1981 | Güralp |
| 4,586,260 A | 5/1986 | Baxter et al. |
| 4,879,508 A | 11/1989 | Andermo |
| 5,153,494 A | 10/1992 | Hollis |
| 5,524,488 A | 6/1996 | Foote |
| 5,569,852 A | 10/1996 | Marek et al. |
| 5,834,864 A | 11/1998 | Hesterman et al. |
| 5,864,062 A | 1/1999 | Nagahara et al. |
| 5,864,063 A | 1/1999 | Otani et al. |
| 6,029,517 A | 2/2000 | Brun et al. |
| 6,073,490 A | 6/2000 | Konovalov et al. |
| 6,105,427 A | 8/2000 | Stewart et al. |
| 6,196,067 B1 | 3/2001 | Martin et al. |
| 6,294,400 B1 | 9/2001 | Stewart et al. |
| 6,308,569 B1 | 10/2001 | Stewart |

*Primary Examiner*—Hezron Williams
*Assistant Examiner*—Jacques M. Saint-Surin
(74) *Attorney, Agent, or Firm*—Trojan Law Offices

(57) ABSTRACT

The present invention is a seismometer/velocimeter, and can be also made to function as an accelerometer. The invention comprises an in-plane suspension geometry combined with a transverse periodic-sensing-array position transducer. The invention can incorporate a feedback actuator of magnetic design, incorporating fixed magnets and planar coils on the surface of the proof mass allowing for much lower noise than an equivalent electrostatic actuator without requiring high voltages. The invention may also have a dual-axis configuration by using two sets of springs. The nested suspensions allow the proof mass to move in two orthogonal directions. A three-axis configuration is possible by combining the dual-axis version with sensing and actuation of the proof mass motion out of the plane. The position sensing for the out-of-plane motion can be made using schemes common in existing state-of-the-art sensors. Actuation for the sensors may be electrostatic or electromagnetic in each of the axis.

16 Claims, 12 Drawing Sheets

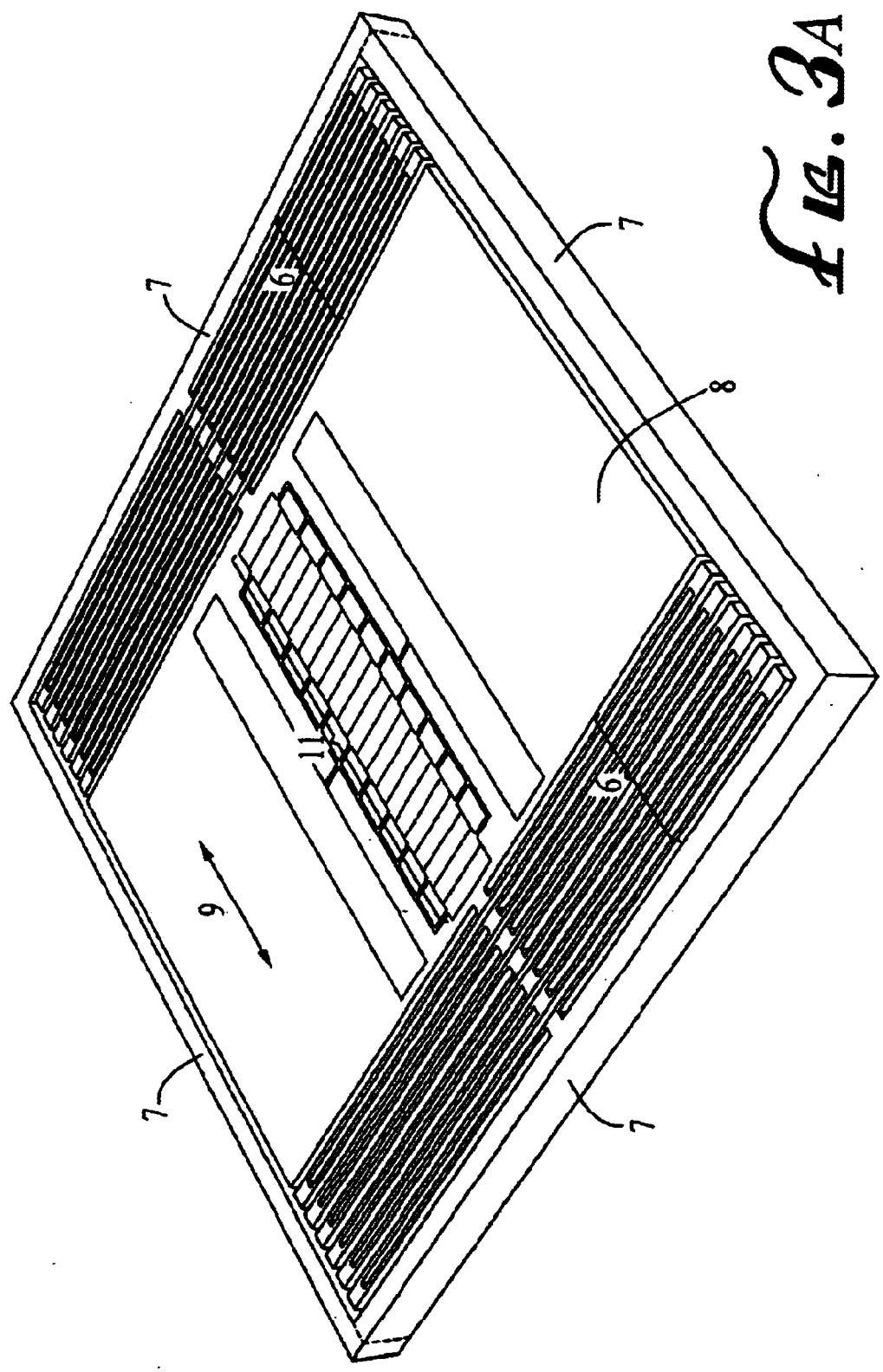

MICRO-MACHINED ACCELEROMETER

BACKGROUND OF THE INVENTION

1. Field of Invention

The invention relates to both acceleration transducers and seismic instrumentation in general and in particular to micro-machined accelerometers and seismometers (velocimeters) and their associated electronics.

2. Description of Prior Art

Conventional broadband seismometers determine the ground motion due to a seismic event by measuring the motion of a suspended proof mass. The most sensitive seismometers measure the displacement of the proof mass using a differential capacitive position transducer. This transducer determines the displacement between two fixed plates either side of a parallel moving plate attached to the suspended proof mass by a differential measurement of the parallel-plate capacitances between the fixed and moving plates. The sensitivity of such transducers increases as the nominal gap between the fixed and moving plates is reduced. The greater the sensitivity of the transducer, the less subsequent electronic gain is needed and consequently the less the contribution of the electronics noise to the total sensor self noise. However, the thermal noise of the seismometer increases as the gap is reduced due to the increased damping. The damping of the proof-mass motion due to the gas in the gap between the two plates results in a residual thermal motion of the proof mass even in the absence of an external acceleration. This so-called squeeze-film damping increases with the reduction of the nominal gap. Hence optimum performance is a compromise between increasing the sensitivity and reducing the damping and hence the thermal noise. An indication of the noise-floor limit of a spring-mass sensor due to the intrinsic background thermal motion of the sensor's proof mass is the so-called MTQ product, where M is the proof mass, T is the period of the proof mass resonant frequency, and Q is the quality factor of the spring-mass system. The noise-floor limit of a sensor is inversely proportional to the square root of MTQ and hence for the lowest noise the MTQ product must be maximized. This implies a large mass (broadband seismometers have masses of the order of 100 grams), a low resonant frequency (again, up to several seconds in a broadband instrument), and finally a high quality factor, Q, which due to viscous and material damping is normally rather modest in a conventional broadband seismometer. For the large proof-masses used in conventional mechanical seismometers, in the range of tens to hundreds of grams, this compromise still results in instruments readily capable of resolving signals down to the terrestrial noise floor.

The relatively small gaps that need to be maintained for this performance require that conventional mechanical seismometers need to be operated in a closed-loop configuration, with an actuator centering the proof-mass plate between the two fixed plates. An added advantage of using feedback is the ability to shape the frequency response of the seismometer and produce a linear signal; parallel-plate capacitive transducers are inherently nonlinear.

A seismic acceleration signal can, in general, be decomposed into two parts: a steady-state, or "DC", signal due to the Earth's gravity, and a varying, or "AC", signal due to seismic activity. Only the latter is of interest. A major problem in the design of seismic sensors is the very large ratio between these two components; the seismic signal is often more than 160 dB smaller than the gravitational signal. When feedback is used in such circumstances, the actuator is unable to exert a large enough force to counteract the DC force and move the suspended proof mass to approximately a null position without severely degrading the sensor self noise; if a large feedback force were utilized to null the effect of gravity the noise generated by the actuator would dominate the instrument performance. Thus, seismometers employ various mechanical spring (also referred to as flexure) mechanisms to support the static proof mass in the desired orientation by overcoming the DC force, but these spring (flexural) mechanisms have a limited restoring range. Hence, tilt misalignment during deployment, which will result in a residual gravitational force on the proof mass moving the plate gap off the nominal null position, must be minimized, usually to less than a degree.

Conventional broadband seismometers produce a velocity output, preferable in terrestrial seismology since the background-seismic-velocity noise is evenly spread in its power spectrum and so such an output allows the greatest dynamic range of the seismic signal over the band of interest.

There are many limitations to conventional broadband seismometers:

Relatively large size (15 cm×15 cm×20 cm) for a three component device

Relatively heavy mass (several kilograms)

Requirement for accurate leveling either manually or using a complex automatic control system and mechanism Requirement for a stable mounting surface that does not vary over time Sensitivity of the suspension to temperature variation requiring a relatively well controlled thermal environment.

Relatively high electrical power consumption (1 to 3W)

Delicate suspensions requiring the mass to be mechanically locked before transportation.

High cost

Several attempts have been made to produce seismometers using MEMS technologies to overcome these disadvantages. Commercially, MEMS great advantage is in using high-definition processes developed by the semiconductor industry, originally for batch electronics fabrication, to machine mechanical structures at otherwise unavailable spatial resolution. The repeatability of the processes results in a large number of devices with well-characterized performance, while the batch processing results in low unit cost.

Maximizing MTQ has proved very problematical for silicon sensors and currently the state of the art sensor do not approach the desired performance. The first limitation is that mass requires volume, and the maximum practical size for the entire die is of the order of 2 cm square with a wafer thickness of 1 mm. A proof mass using most of this die volume would weigh a few grams at most.

The next limitation is the natural frequency of the spring-mass system, determined by the relative strength of the spring to the mass. As the natural frequency is reduced, the sag of the linear suspension under gravity determines the overall dimensions of an open-loop sensor. A 10-Hz suspension will sag by 2.5 mm under 1 g requiring sensor geometry large enough to accommodate this movement of the proof mass. No existing micromachined sensor uses such a low resonant frequency. Thus, the MT of the MTQ product is already a factor of 100 to 1000 less than the conventional broadband sensor.

The only factor left is the quality factor, Q, of the suspension. This is the area where efforts have been concentrated in realizing a practical silicon seismic sensor. Unfortunately, although silicon is an excellent mechanical material capable of sustaining Q's of the order of more than 10,000, the practicalities of the device structure results in a degradation from these high values due to viscous gas damping. Currently the only approach to reducing this viscous damping is to seal the device in a very high vacuum and maintain this vacuum throughout the life of the product. This vacuum needs to be less than about one mTorr as the damping is independent of pressure until the residual gas in the cavity is rarified. This requirement greatly increases the difficultly and cost of making a silicon micro-seismometer. In addition, existing micromachined accelerometers with feedback use electrostatic actuation. This has the disadvantage of either producing an acceleration rather than the preferred velocity output or, in order to produce a velocity output, injecting excess noise due to the required active differentiator in the feedback path.

SUMMARY OF THE INVENTION

The present invention comprises an in-plane suspension geometry combined with a transverse periodic-sensing-array position transducer with open-loop DC and closed-loop AC operation to provide many improvements over the prior art. The use of a transverse motion in the mass eliminates squeeze-film damping allowing a high Q suspension to be developed without the need for the vacuum encapsulation of the prior art. The use of deep reactive-ion etching to form this structure provides for improvements over the prior art such as the creation of compact highly resilient suspension with a low resonant frequency, and a very good aspect ratio of the springs, minimizing unwanted out-of-plane motion. A large displacement of the proof mass can be accommodated to allow operation of a relatively low-resonant-frequency suspension in a large DC acceleration field, increasing the mechanical gain of the suspension and reducing the suspension noise. As the full output swing of the periodic sensing array is available for a displacement which is only a fraction of the full-scale displacement, a much larger gain is possible for the position transducer, reducing the transducer's noise. The use of a feedback actuator of magnetic design, incorporating fixed magnets and planar coils on the surface of the proof mass, offers advantages over the prior art. The magnetic actuator provides much lower noise than an equivalent electrostatic actuator, and does not require high voltages. Feedback allows the micro-seismometer's response to be flat across the frequency band of interest, in contrast to the very peaked open-loop response which would otherwise be obtained from such a high-Q suspension. When combined with the periodic sensing array above, the feedback need only operate over slightly more than one period of the position transducer, reducing the force required and hence both the power and noise of the actuator. Limit control electronics are incorporated in the feedback loop to allow for the transition between adjacent null points. Although the magnetic actuators used in this invention have been described in the literature this particular application is unique and novel in that the use is not actually to create motion for a positioning mechanism but to oppose it in a sensing system.

The sensor can be deployed at a random orientation and so operate without complex manual or automatic tilt-removal mechanisms, allowing measurement at sites where the mounting platform is not stable. Further the suspension is sufficiently rugged that no mass locking is required.

Finally, due to the small size of the proposed device it is possible to actively control its temperature using a Thermo-Electric-Cooler (TEC) a co-located temperature sensor and a control system. This technique allows operation with temperature variations of below 0.01C. using currently available technology, thus removing the requirements for external control of the thermal variations.

BRIEF DESCRIPTION OF THE SEVERAL VIEWS OF THE DRAWINGS

FIG. 3a is a perspective view of the single-axis transducer suspension plate.

DETAILED DESCRIPTION OF THE INVENTION

Figure 5A:
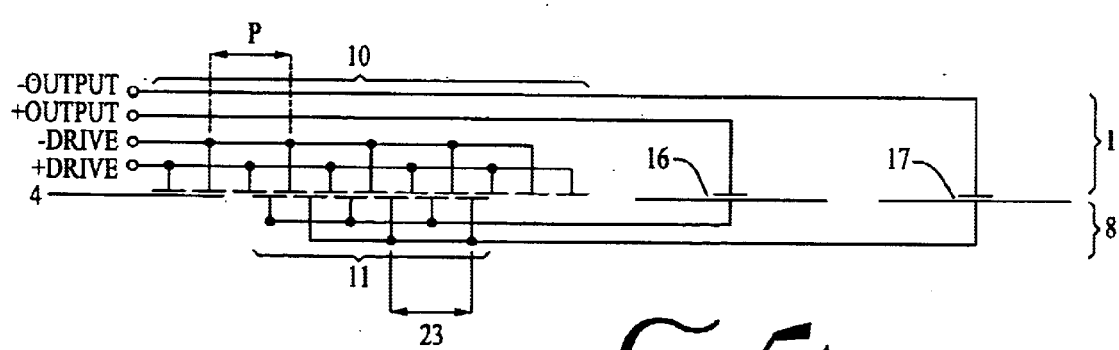
FIGS. 5a, 5b, 5c, and 5d are electronics schematics for the present invention.
Figure 5B:
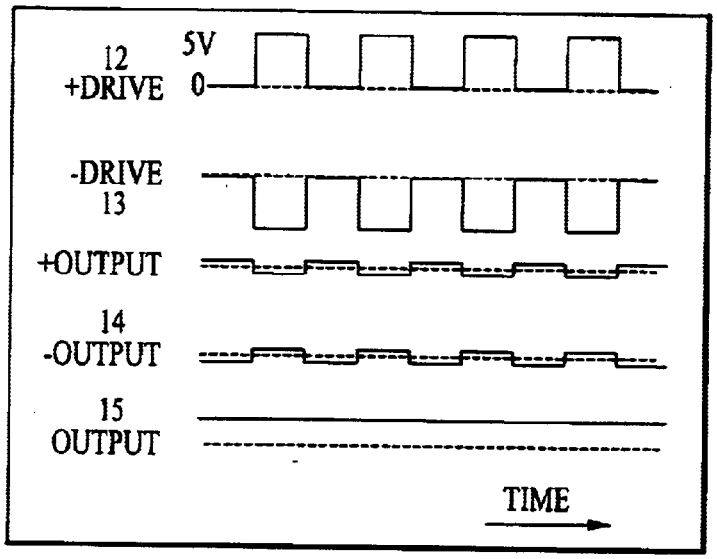

FIGS. 1, 2, 3a and 3b, depict the accelerometer in its single-sensing-axis implementation comprising two plates, a fixed plate (1) and a suspension plate (2), stacked in parallel and bonded together at their edges (3) while their central portions are separated by a machined cavity (4). An additional fixed plate (5), with a central cavity, can be optionally bonded onto the other side of the suspension plate to protect the moving parts of the structure. The cavity can be left filled with inert gas or can be evacuated if the increase in Q can be justified with respect to the additional complexity of fabrication. The suspension plate (2) is machined through its thickness to produce flexures (6) between the outer frame portion (7), and an inner proof-mass (8), portion of the moving plate. This suspension is so designed to allow the proof mass to move in a single direction (9), in the plane of the suspension. The plates have either deposited on, or machined into their surfaces on either side of the cavity (4), arrays of fixed (10) and proof-mass (11) electrodes, the direction of periodicity of the arrays aligned to the allowed motion of the proof mass. The proof-mass and fixed electrodes have the same periodicity. Displacement of the proof mass under acceleration changes the relative position of the proof-mass electrodes and the fixed electrodes. A small change in the relative position of these electrodes changes the overlap between the fixed and proof-mass electrodes and so can be transduced as a change in the capacitance between the fixed and moving plates through suitable drive and pick-up electronics (FIGS. 5a, 5b, 5c, 5d). FIG. 5b depicts alternate fixed electrodes in the array are driven out of phase by a +DRIVE and −DRIVE square-wave pulse train (12, 13) or a sinusoidal signal and its inverted signal. The frequency of this drive signal is high enough to minimize the low-frequency (so-called 1/f) noise common to analog electronics while not so high as to require higher-power amplifiers. The proof-mass electrodes (11) are similarly divided into two alternating sets in order to produce a differential output (14, 15). This output, in the implementation shown schematically in FIG. 5a is capacitively coupled back to conductors on the fixed plate through two pairs of capacitor plates (16, 17). These plates are so arranged with one plate being much larger than the other such that this coupling occurs over a capacitance that remains constant with full deflection of the proof mass. Alternatively, this coupling stage can be eliminated if provision is made to take the output signals directly off the proof mass by, for example, producing a pair of conducing traces along the flexures.

The resonant frequency of the suspension and the spacing of the capacitance array are designed so that under steady forces, such as supplied, for example, by a gravitational field, the proof mass is displaced by many array periods (23), while under the expected varying accelerations the displacement (21) is less than one period (23). The entire range of the output signal is therefore made available for accelerations that are a small fraction of the equivalent steady bias acceleration.

The lateral motion of the proof mass, with the fixed and proof-mass electrodes moving transversely, is designed to reduce damping due to the gas in the cavity between the plates compared to the traditional perpendicular, opposed motion of the plates in existing capacitance accelerometers. In contrast to the squeeze-film damping between the two plates in the usual case, the lateral motion produces classic shear damping. Analysis of the relevant expressions for damping indicates that the damping in the preferred embodiment is reduced compared to an equivalent parallel plate transducer by the square of the ratio of the proof mass's linear dimension to the capacitance gap. This damping can be further reduced by relieving, through etching, the fixed-plate surface outside of the electrode area to increase the cavity gap in these regions.

Through combining a suspension that is compliant only in the desired direction of acceleration transduction, and an arrangement of sensing electrodes, which is insensitive to proof-mass motion except in the desired direction, the accelerometer has a high level of rejection to out-of-axis signals. This lack of cross-axis sensitivity is very important for quantitative seismic applications.

Figure 5C:
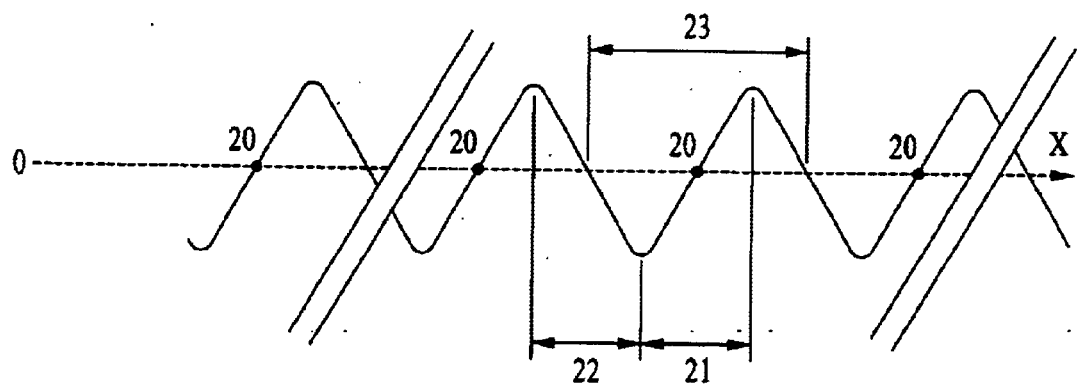

Negative feedback can be implemented to control the position of the proof mass. The transducer has a position varying output as depicted in FIG. 5c. There are a number of equivalent null points (20) at which the proof mass can be controlled as the feedback attempts to null the output signal. If the initial position of the proof mass is within a region of positive slope of the transduction signal (21), the feedback operates negatively to bring the proof-mass position towards the null point. If the initial position is within a region of negative slope (22), the feedback operates positively, driving the proof mass out of that region. Hence, whatever the initial position of the proof mass, feedback will drive it toward the nearest null point. By introducing limit control electronics into the feedback loop, it is possible to reset the feedback to the nearest null point; if the actuator signal falls outside of the preset limits on the limit control electronics, the feedback is opened, zeroing the force on the actuator, and the mass will stabilize to its open-loop position. When feedback is then reapplied, the feedback will again drive the proof mass to the nearest null point. The preset limits need only span slightly more than the signal range required to drive the proof mass between adjacent null points. The small additional actuator signal margin ensures stability at the transition. Hence the actuator only needs to be sufficiently strong to drive the mass over a little more than one period of the transduction signal. Both the transduction and actuation signals repeat periodically within the entire range of motion of the proof mass, reducing the dynamic range requirements of the electronics. The actuation for this feedback may be:

a. Electrostatic, with a second set of actuator plates, similar to the transducer plates, on the fixed plate and proof mass providing the force. The arrangement of plates and voltages being such that the force produced is a linear function of the applied voltage.

b. Electromagnetic, with a fixed external magnetic circuit (24) and coils (25) formed on the proof mass (8) (FIG. 6) providing the force. The magnetic circuit consists of two magnet sets on each side of the assembled plates, so designed that the major portion of the magnetic field in the volume of the plates is in a direction perpendicular to the plates and restricted to two rectangular regions, of opposed magnetic direction to each other, within the area of the proof mass. The coils on the surface of the proof mass planar spirals are square or rectangular in the preferred embodiment, with the opposing, straight portions of the spirals falling within the two regions of the magnetic field. The central, unfilled, portion of the spiral is of sufficient width, and the two regions of the magnetic field are sufficiently wide, so that the straight portions of the spiral remain within their respective regions of the magnetic field for all anticipated displacements of the proof mass.

Figure 5D:
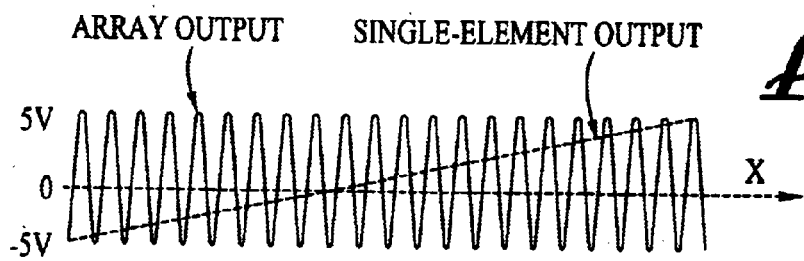

The output from either the open or closed-loop configuration repeats with the periodicity of the transducer electrode array. Hence to provide full information for the position of the proof mass a second single-element transducer is required to determine an approximate position. A single-element capacitive transducer whose signal varies monotonically with proof-mass displacement can provide this. FIG. 5d depicts the two outputs from the single-element and the array transducer. This signal can be used as an additional output to combine with the single period output to allow large signals to be sensed or to allow the actual direction of the gravity vector to be determined to aid in establishing the orientation of a randomly deployed sensor.

Fabrication

Figure 7A:
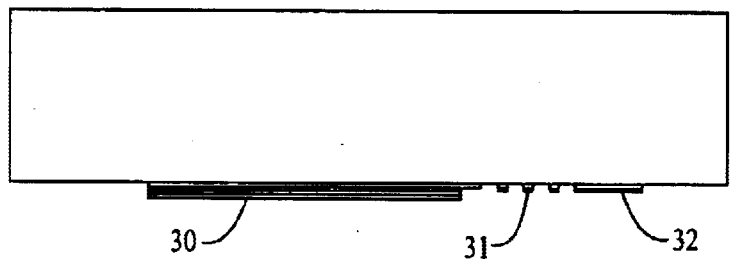
FIGS. 7a, 7b, 7c, 7d, 7e, 7f, and 7g are cross-sectional views showing various stages of the etching and fabrication process.
Figure 7B:
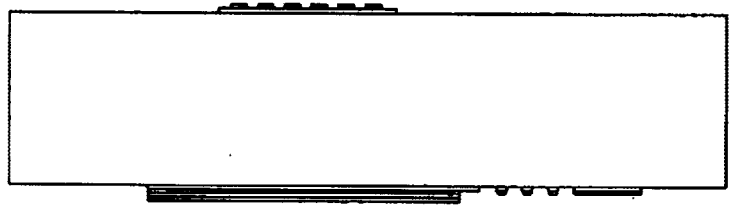
Figure 7C:
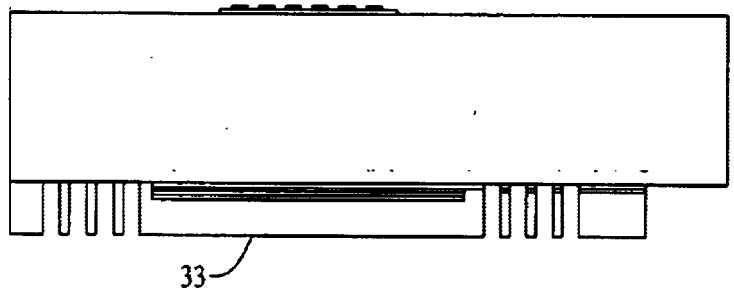
Figure 7D:
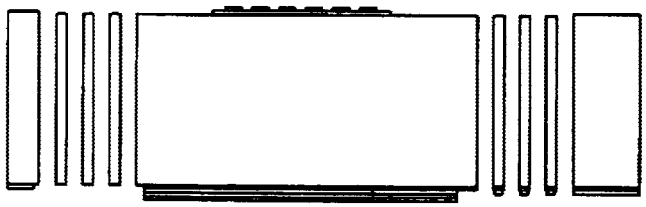
Figure 7E:
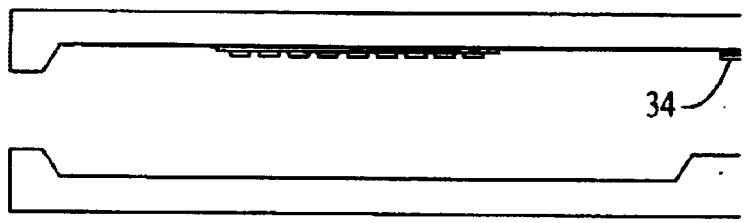
Figure 7F:
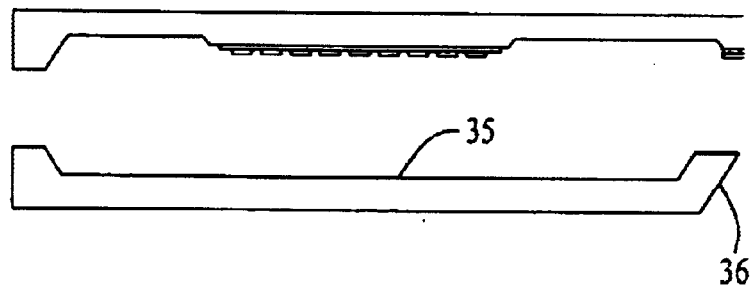
Figure 7G:
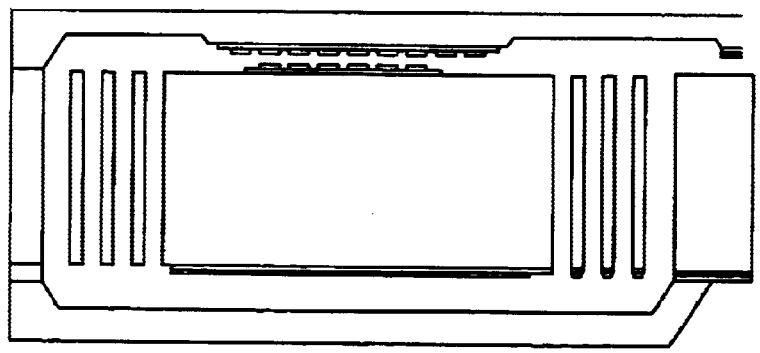

FIGS. 7a through 7g depict the fabrication through DRIE. The plates may consist of portions of silicon wafers, with deep, reactive ion etching used to pattern through the wafer to produce the frame, suspension and proof mass. In the first step, as depicted in FIG. 7a, the coils for the electromagnetic actuation are patterned on one side of the proof-mass portion of the suspension wafer (30) using deposition and patterning of conducting and dielectric material. Traces are patterned (31) along the flexure portion to bonding pads (32) to provide a conductive path to drive the coil. For a dual axis device these traces would be deposited on both flexures to reach the outer frame of the device. The capacitor electrodes are patterned on the other side of the proof-mass portion (FIG. 7b). Resist (33) sufficient to withstand through-wafer etching is deposited and patterned on one (as shown in FIG. 7c) or both sides of the wafer, and the wafer is deep-reactive-ion etched to produce the suspension structure (FIG. 7d). The shallow cavity in the fixed wafer is anisotropically etched (FIG. 7e) followed by the deposition of the fixed-plate electrodes, again involving the patterning and deposition of metals and dielectrics. Traces are brought out to bonding pads (34). An additional etch further relieves the fixed plate outside of the electrode areas to reduce damping. The cavity (35) in the lower wafer is anisotropically etched (FIG. 7f) followed by a backside, through-wafer anisotropic etch allows access to the coil pads after bonding (36). The structure is finally bonded together (FIG. 7g) and then diced to produce individual devices.

Alternatively, to produce electrostatic actuation, electrostatic arrays can be deposited on the proof mass and the fixed plate which through suitable excitation will produce a lateral force, an implementation which is well known in the state of the art.

Alternatively, the fixed plate may be replaced by a structure consisting of an electrode array layer and sacrificial layer initially deposited on the un-machined moving plate, and processed by etching of the sacrificial layer to produce an electrode array separated from the moving plate over the suspension and proof mass while bonded to the frame portion of the moving plate.

An additional alternative fabrication involves using two wafers to form the proof-mass and flexures. In this construction the actuator coil is placed on one of the wafers in a position such that when the wafers are bonded together to form the proof-mass the coil is in the center of the structure. This ensures that the force generated by the actuator passes through the center of mass of the proof-mass preventing the excitation of spurious modes by an off axis actuator.

Electronics

The electronics are designed to produce either an acceleration output in either open-loop or closed-loop configuration or a velocity output from the sensor in a closed-loop configuration. The implementation of the feedback circuit determines the output of the device. If the feedback force (which is proportional to the current through the feedback coil) is proportional to sensor output voltage, as can be achieved with a resistive feedback element, then the sensor generates ground-acceleration-proportional output. If the feedback force is proportional to the derivative of the sensor output voltage as can be achieved with a capacitive feedback element, then the sensor generates ground-velocity-proportional output and such a sensor is a seismometer (velocimeter). The variants of the sensor are listed below.

The open-loop accelerometer, an embodiment of limited utility due to both the uncontrolled high Q of the suspension and the cyclic output signal, comprises: an oscillator producing square or sine wave excitation, the positive drive signal; an inverter producing a signal of opposite polarity used as the negative drive signal; a low-noise differential amplifier (37) producing a signal proportional to the difference of the two drive signals capacitively coupled into the sensing electrodes from the drive electrodes; an optional additional amplifier further amplifying the single-ended output from the preamplifier; a synchronous demodulator (38) locked to the initial oscillator demodulating the signal; a filter stage removing the oscillator frequency from the analog output (38).

Figure 8A:
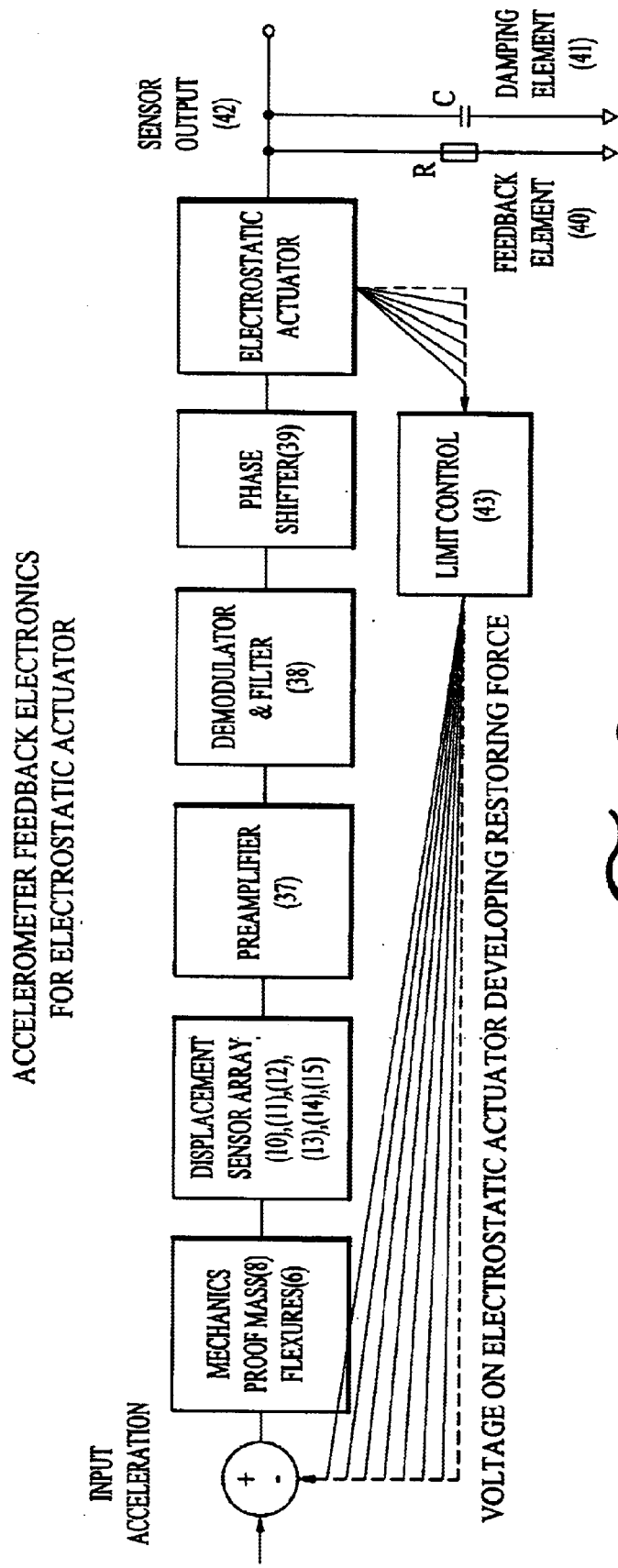
FIG. 8a is a block diagram of the accelerometer feedback electronics for an electrostatic actuator.

The closed-loop accelerometer with electrostatic feedback (FIG. 8a), where the output from the previous circuit is used as an error signal into an amplification and phase-shifting stage (39), to shape the open loop frequency response of the system for stability and sufficient open-loop gain. The voltage output (42) from this is feedback as a voltage to an electrostatic transducer that produces a force that is linear with the applied voltage. A limit control circuit (43) is used to remove the feedback voltage when its value exceeds the linear range of the actuator due to potential long term tilt change or electronic drift so that the device will adjust to a new null position (20) such that the feedback voltage is again within its linear range.

A magnetic actuator can be used to provide the feedback force. Such an actuator has two major advantages over the more normal electrostatic implementation of MEMS:

The output from the resulting sensor will have the right response to maximize the dynamic range of terrestrial signals;

Electromagnetic actuators produce much higher forces than their electrostatic equivalents and a low current can be driven through a coil with less noise than a high voltage can be put on a plate. Hence an electromagnetic actuator will have less noise than its electrostatic equivalent.

The minor disadvantages are:

The introduction of magnetic material into the fabrication with associated costs in mass and complexity;

A more complex actuator geometry as coils rather than plates must be fabricated.

These advantages substantially outweigh their costs.

Figure 6:
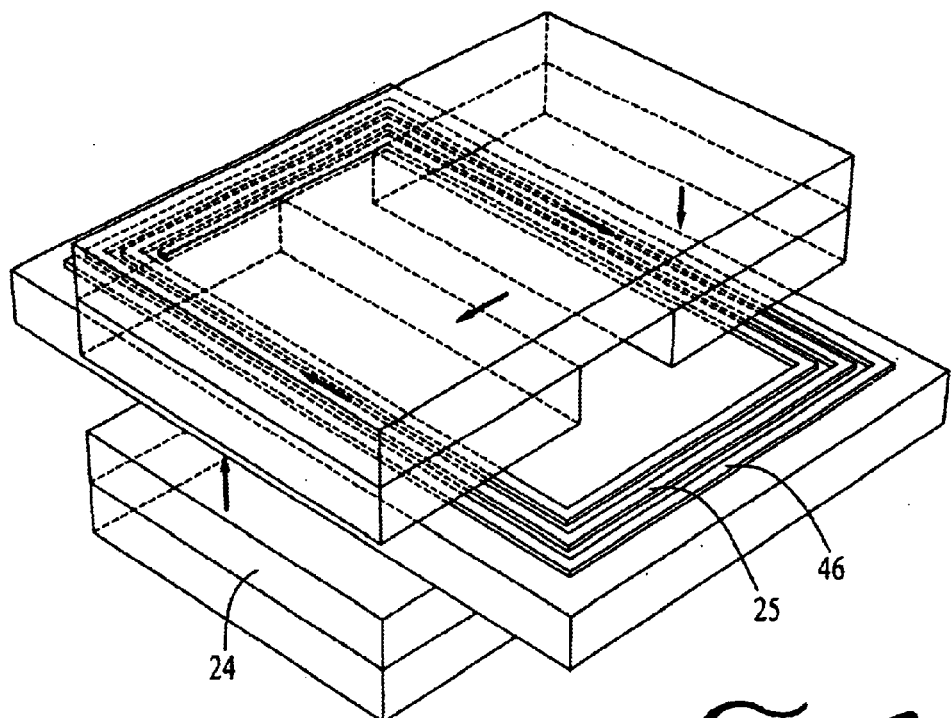
FIG. 6 is a perspective view of the magnetic circuit.
Figure 10:
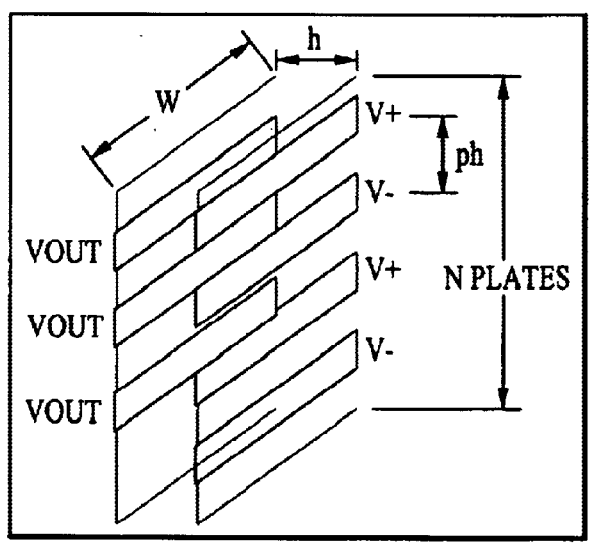
FIG. 10 is a diagram showing the plate arrangement.

An actuation geometry has been adopted to produce as compact system as possible. The principle behind actuator design is shown in FIG. 6. Two external magnets of flattened horseshoe geometry are mounted on either side of the silicon die. A set of rectangular spiral coils (25, 46) metallized on the proof mass are connected to the external electronics. As a current flows through the coil, the proof mass experiences a lateral force from both arms of the magnetic coil. The coils are designed so the expected sag of about 2.5 mm for a 10 Hz suspension does not change the effective geometry of the actuator.

Figure 8B:
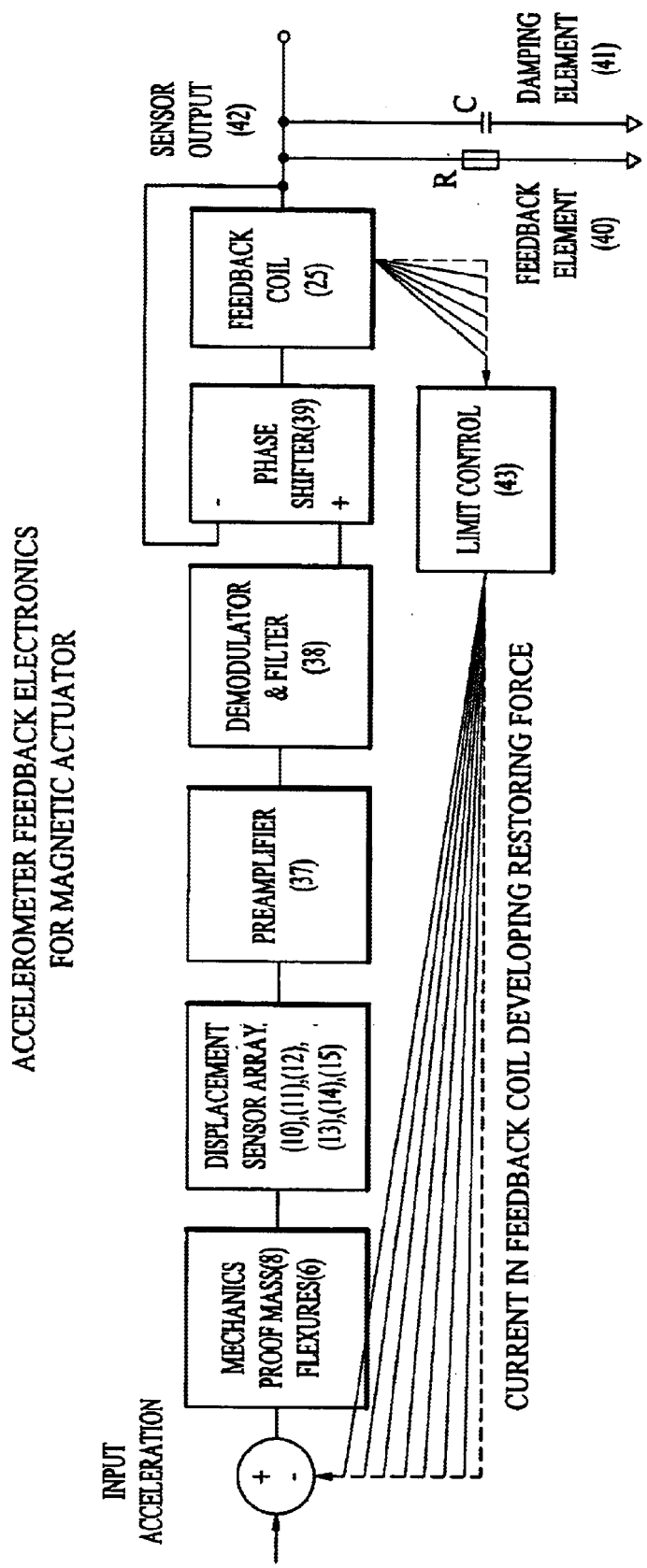
FIG. 8b is a block diagram of the accelerometer feedback electronics for a magnetic actuator.
Figure 8C:
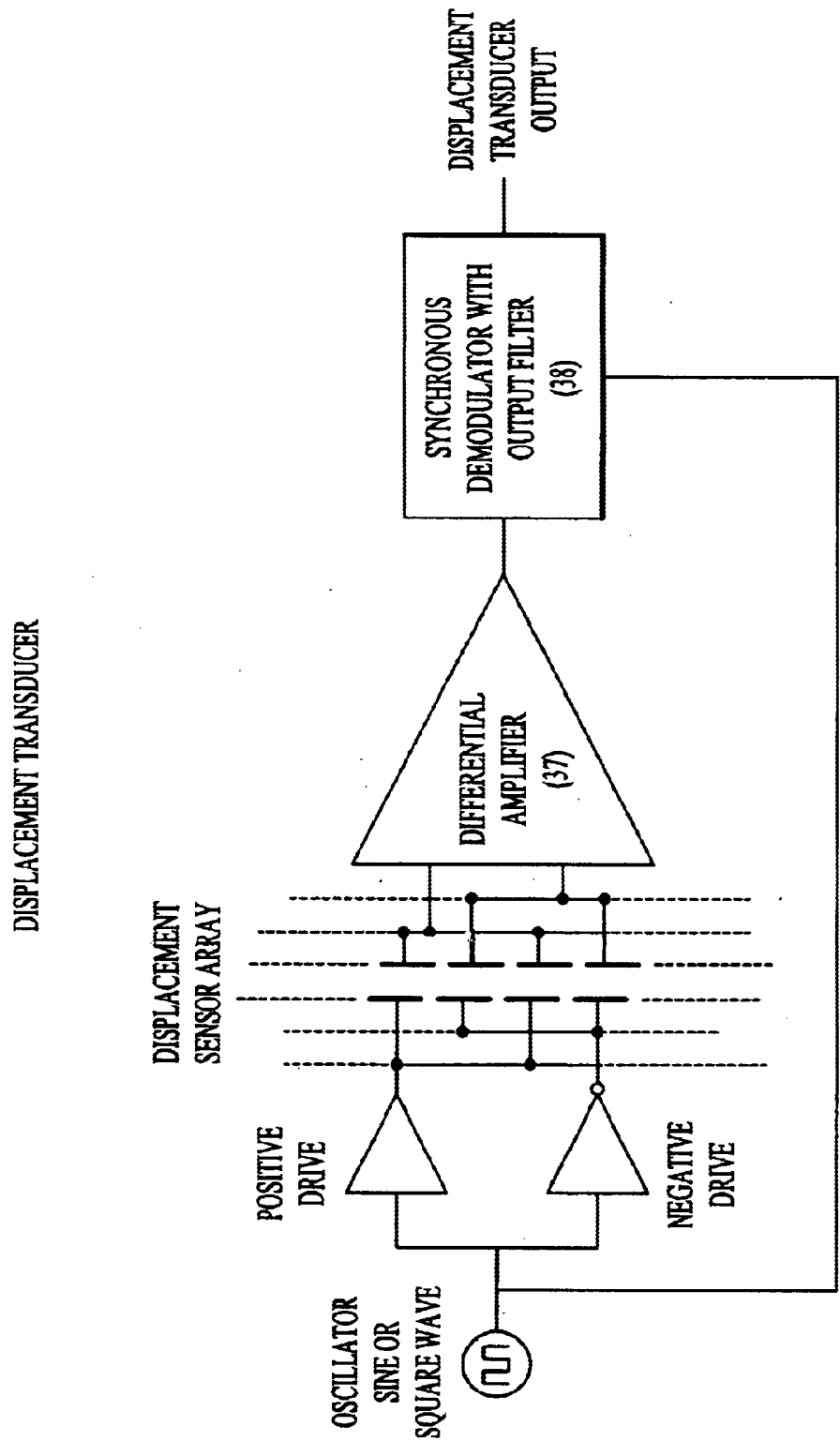
FIG. 8c is a block diagram of a displacement transducer.

The closed-loop accelerometer with magnetic feedback (FIG. 8b), where the output from the circuit described in the closed-loop accelerometer with electrostatic feedback is fed into an amplification and phase shifting stage (39), which is configured as a trans-conductance stage. Its resultant current is supplied to the magnetic actuator (25). The benefits of a current driven transconductance magnetic actuator (25), compared to known solutions which use voltage driven actuators, are significant. The inductance of the magnetic actuator does not create a phase shift at high frequencies, resulting in improved system stability and removing the requirement for complex frequency compensation techniques. Changes in the resistance of the magnetic actuator coil due to temperature, do not change the strength of the feedback and thus do not influence sensor sensitivity. Production tolerances of the magnetic actuator have less influence on sensor sensitivity since the coil resistance becomes less important. A limit control circuit (43) is used to remove the feedback current when its value exceeds its linear range due to potential long term tilt changes or electronic drift so that the device will adjust to a new control point (20) such that the feedback current is again within it's linear range.

Figure 9:
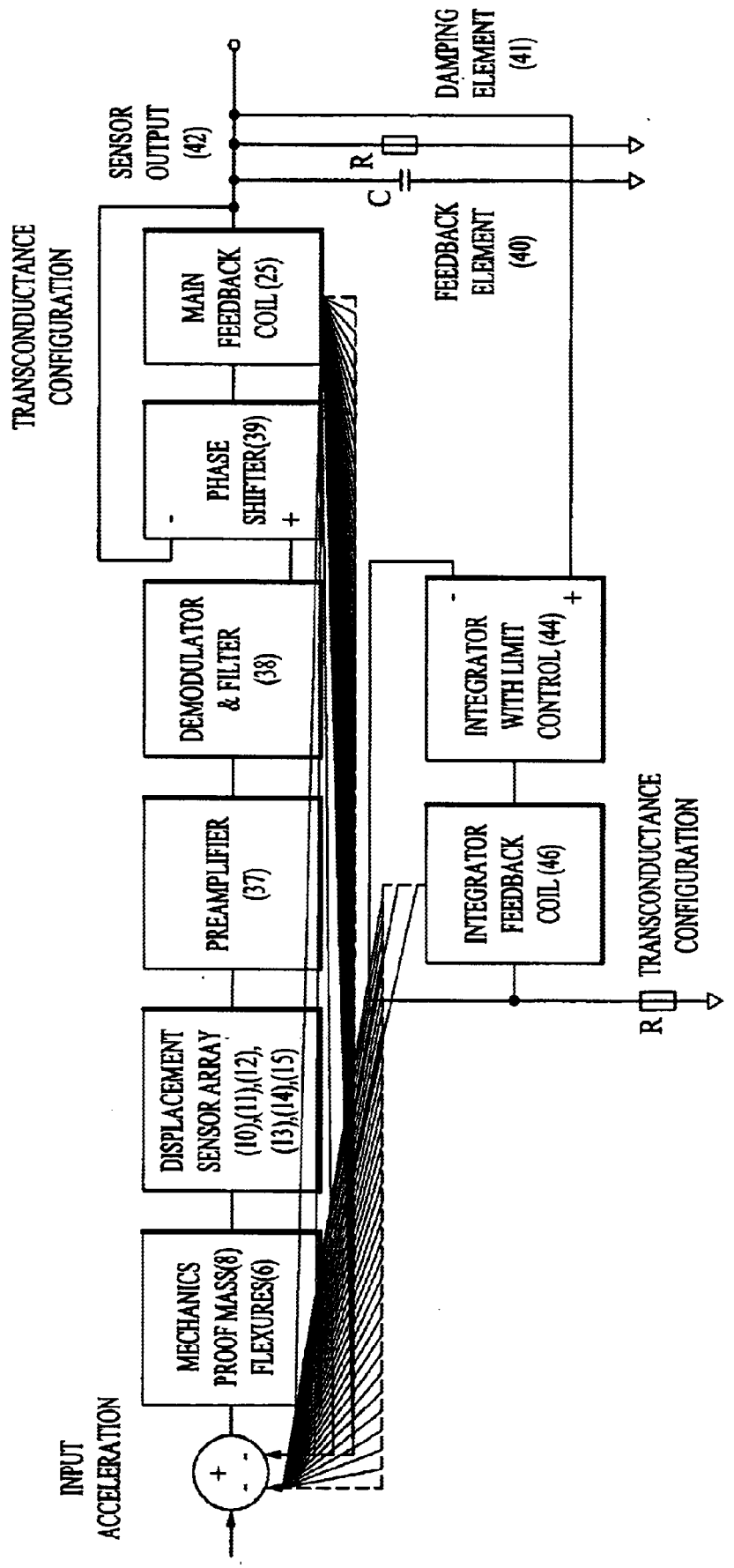
FIG. 9 is a block diagram of the feedback electronics of a velocimeter/seismometer.

The closed-loop seismometer or velocimeter (FIG. 9) with two magnetic actuators (25) (46), which comprises the components in the closed-loop accelerometer with electrostatic feedback; an amplification and phase shifting stage (39) which keeps the open-loop gain sufficiently high despite the diminishing gain of the acceleration transducer mechanics at high frequencies, and properly shapes the open-loop frequency response to assure system stability. This stage is configured as a trans-conductance stage, which transforms voltage to current that is driven through the main feedback coil (25) and the feedback elements, the feedback capacitor (40) and the feedback resistor (41). The benefits of the trans-conductance configuration of the stage (39) are the same as described above. The feedback capacitor (40) differentiates the output voltage of the amplification and phase shifting stage (39) and thus ensures the sensor output voltage is proportional to ground velocity, and the resistor (41) properly damps the closed loop system response by adding some proportional feedback to the system; the output is applied to an integrator stage (44) having a very slow response, below the lowest frequency of interest, the integrator output current is fed through a second magnetic actuator (46) on the proof mass (8). The integrator output controls the steady-state proof-mass position in such a way that transducer output is zeroed, ensuring the null position of the proof mass is maintained. The Integrator stage (44) is configured as a trans-conductance stage. In addition to all benefits of trans-conductance configuration described above, it also diminishes the low frequency noise of the sensor. The integrator is positioned in the feedback path of the system, thus all noise generated in it is not reduced by the closed loop design principle of the sensor, but appears in full at the output of the sensor. Minimizing noise in this stage is crucial. In existing embodiments, where the magnetic actuator/integrator feedback coil (46) is voltage driven, changes in coil resistance due to temperature changes induce low frequency noise at the sensor output. With the trans-conductance approach these changes become insignificant. The integrator (44) contains a limit control mechanism to reset the integrator output when it's value exceeds the linear range of the Integrator due to potential long term tilt changes or electronic drift so that the device will adjust to a new control point (20) such that the Integrator output is again within its linear range.

Two and Three-Axis Embodiment

Figure 1:
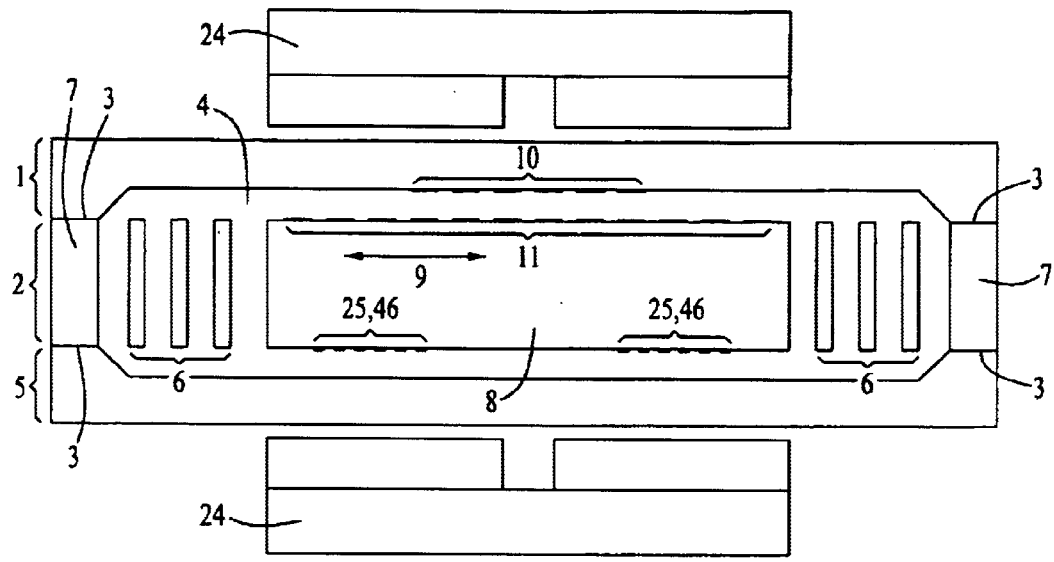
FIG. 1 is a cross-sectional schematic view of a microseismometer.
Figure 2:
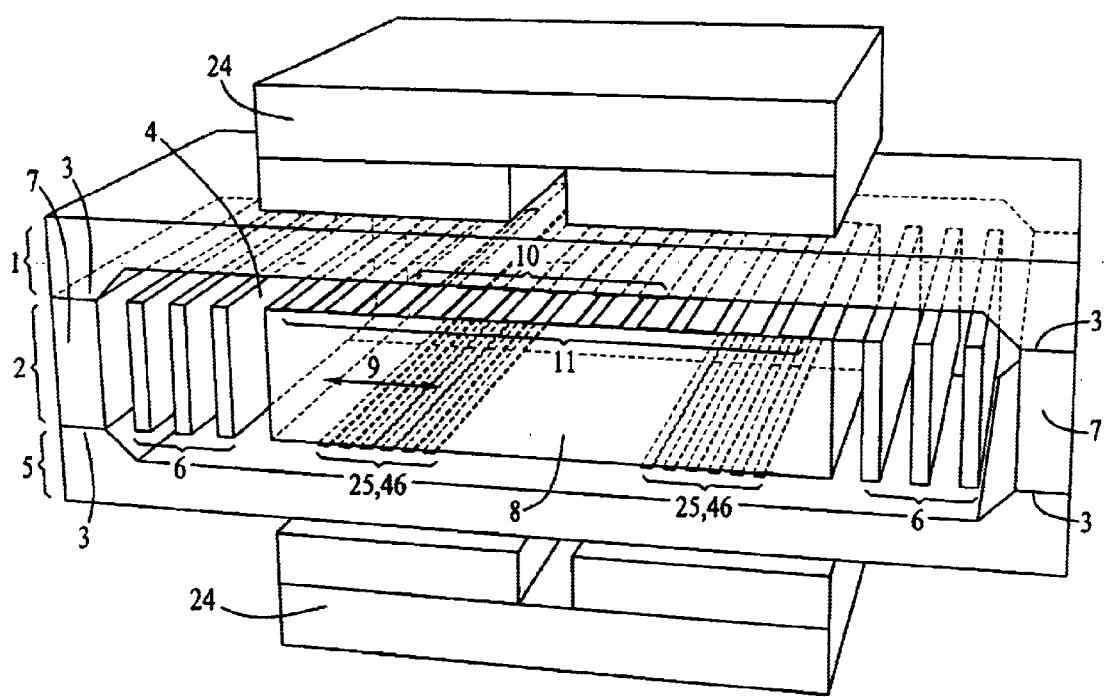
FIG. 2 is a perspective three-dimensional view of a microseismometer.
Figure 3B:
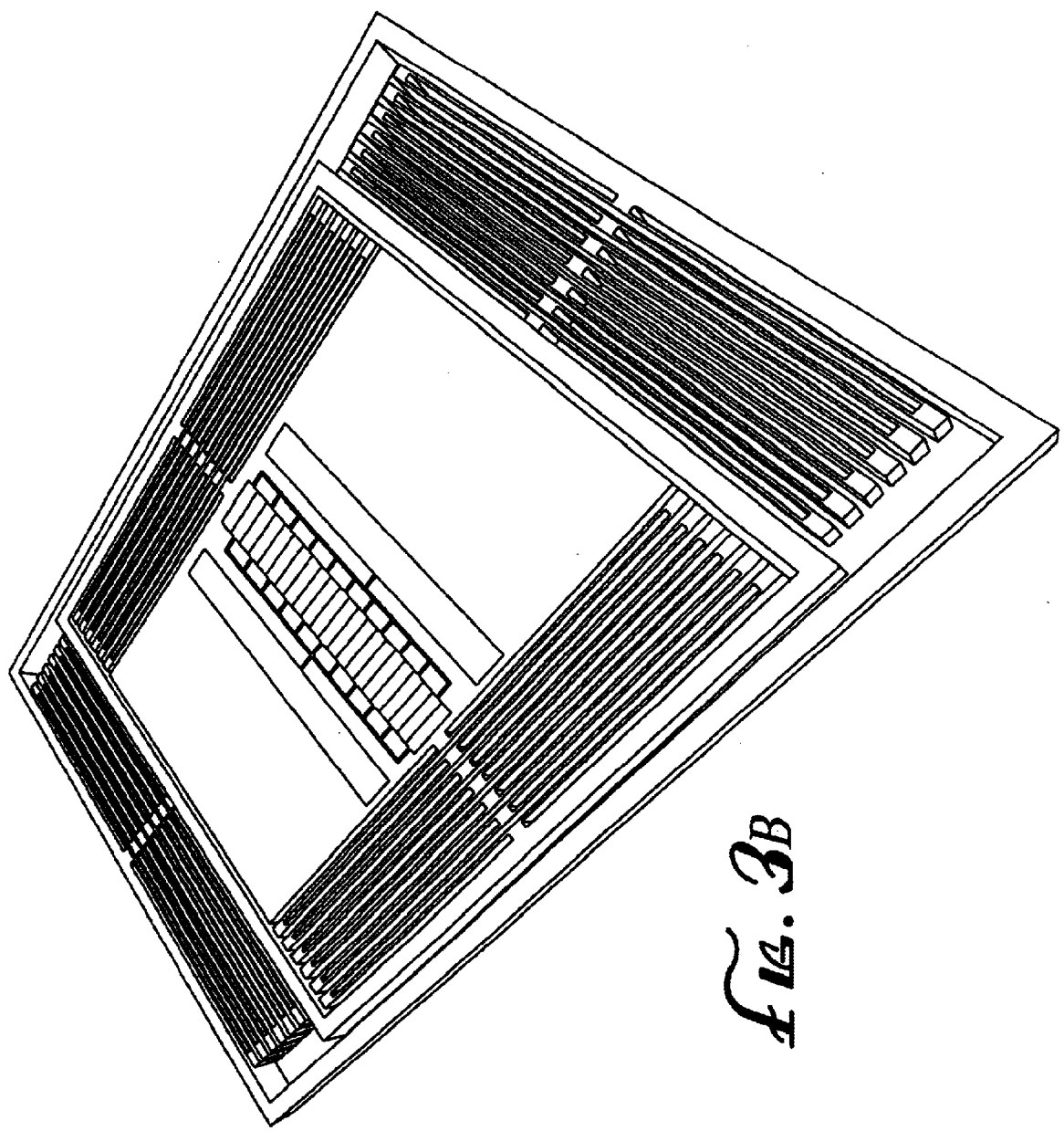
FIG. 3b is a perspective view of dual-axis transducer suspension plate.
Figure 4:
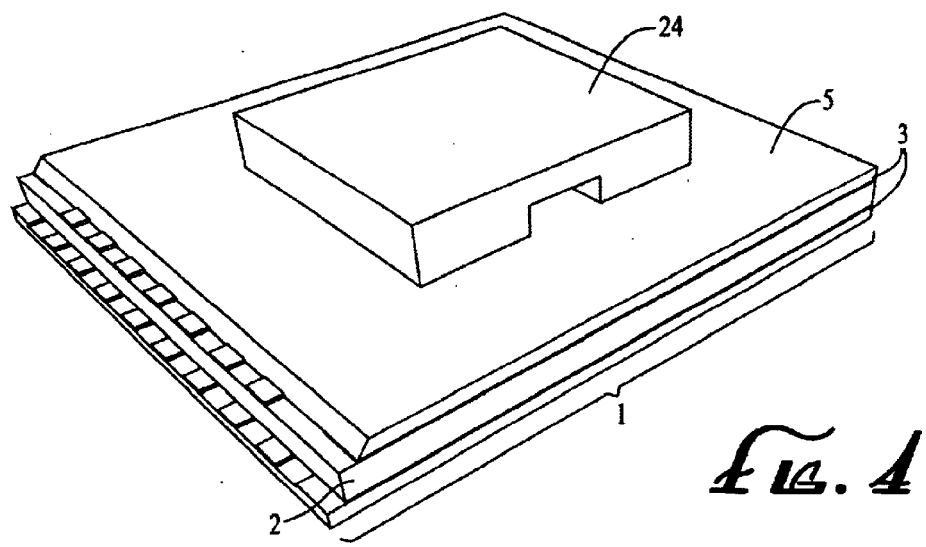
FIG. 4 is a perspective view of a wafer stack with magnet, shown inverted in comparison with other figures.

A further embodiment of the same invention creates a dual-axis sensor. By using two sets of springs it is possible to make a dual-axis sensor (FIG. 3b). The nested suspensions allow the proof mass to move in two orthogonal directions. Position sensing is now achieved using two orthogonal sets of capacitor arrays. The two actuators required for the dual-axis configuration can be produced using two separate coils or two separate electrostatic actuators. These coils must be arranged so that there is no cross-axis coupling between the coils of one axis and the magnetic field of the orthogonal axis.

It is possible to produce a three-axis sensor by combining the dual-axis version described above with sensing and actuation of the proof mass motion out of the plane. As has been explained above, this out-of-plane motion is associated with higher noise due to squeeze-film damping, and so this third axis would have degraded performance. The position sensing for the out-of-plane motion can be made using schemes common in existing state-of-the-art sensors. Actuation in this case can be electrostatic or electromagnetic in the third axis, or this axis can be used open loop. In the case of electromagnetic actuation, by producing part of the magnetic field in the plane of the device suitably placed coils can produce an out-of-plane force.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A transducer comprising:

fixed plate;

a first capacitive sensor array on the surface of said fixed plate, said first capacitive sensor array having a periodic pattern of conductive elements;

a suspension plate with a proof mass supported by a plurality of flexural elements engaging a frame, said plurality of flexural elements capable of constraining said proof mass to motion in a single axis;

a second capacitive sensor array on a surface of said proof mass, said second capacitive sensor array comprising a periodic pattern of equal periodicity to said first capacitive sensor array on said fixed plate, with the direction of the periodicity parallel to said constrained motion of said proof mass;

said fixed plate mounted to said frame of said suspension plate to allow said first capacitive sensor array and said second capacitive sensor array to be aligned in a common direction of periodicity in separated opposition;

an electrical connection to said first capacitive sensor array on said fixed plate allowing a coupling of cyclic excitations from external components through said periodic pattern of said first capacitive sensor array to said periodic pattern of said second capacitive sensor array, said coupling ranging between zero and one hundred percent and being a cycling positional measure of said proof mass with respect to said fixed plate in said constrained planar direction;

an electrical connection to said proof mass sensor array transmitting a signal resulting from said coupling of said fixed plate sensor array to said proof mass sensor array to external electronics for determination of percentage of said coupling and transduce the position of said proof mass.

2. An accelerometer comprising:

a transducer for determining the position of a proof mass relative to a fixed plate by determining a coupling capacitance between a first capacitive sensor array on a surface of said fixed plate and a second capacitive sensor array on the surface of said proof mass, an actuator for generating and emitting an actuation signal in order to move said proof mass; and feedback electronics for using said proof mass position as determined by said transducer in order to produce a feedback signal in order to control said actuator, thereby managing the actuation signal and controlling the motion of said proof mass within desired parameters;

a means for measuring the actuation signal and determining an acceleration component of the movement of the proof mass as a function thereof.

3. The accelerometer of claim 2, wherein the feedback signal controls the actuator in order to maintain said proof mass in approximately a null position within one cycle of said transducer.

4. The accelerometer of claim 2, further comprising a velocity sensor comprising a means for determining a velocity component for the movement of said proof mass by measuring the voltage within said feedback electronics and calculating the velocity component as a function of such measurement.

5. The accelerometer of claim 2, further comprising:
limit control electronics for receiving said actuation signal generated by the actuator and temporarily zeroing said actuation signal if said actuation signal exceeds a preset limit corresponding to movement of said proof mass of a distance substantially more than one half a repeat distance of said transducer.

6. The accelerometer of claim 2, wherein the proof mass is supported by a plurality of flexural elements, said flexural elements constraining movement of said proof mass to a single direction or axis.

7. The accelerometer of claim 6 wherein the flexural elements allow in plane movement in two directions, said in plane movement detected by a second set of separate sensor arrays aligned in periodicity to said two directions.

8. The accelerometer of claim 2, wherein the actuator is an electrostatic actuator.

9. The accelerometer of claim 8, wherein the electrostatic actuator includes a set of actuator plates, one positioned on the fixed plate and one on the proof mass, said plates arranged to receive the actuating signal and generate a force sufficient to move the proof mass.

10. The accelerometer of claim 9, wherein the force generated as a linear function of said actuating signal.

11. The accelerometer of claim 8 having an additional electrostatic actuator to provide a calibration input.

12. The accelerometer of claim 2, wherein the actuator is an electromagnetic actuator.

13. The accelerometer of claim 12 wherein the electro-magnetic actuator includes:
a fixed external magnetic circuit having two magnet sets on each side of the proof mass;
main feedback coil and an integrator feedback coil on said proof mass;
external feedback circuitry using said proof mass position determined from said transducer, said feedback circuitry providing separate feedback currents to said main feedback coil and said integrator feedback coil in order to stimulate electro-magnetic interactions between the two coils and magnets, thereby controlling the movement and position of the proof mass, said main feedback coil and said integrator feedback coil nulling velocity input signals and position input signals to said transducer; and
limit control electronics for temporarily zeroing said feedback current provided to said integrator feedback coil when said current exceeds a preset limit corresponding to movement by the proof mass, in either direction, of a distance greater than one half of a repeat distance of said transducer.

14. The accelerometer of claim 13 wherein said proof mass is comprised of two wafers bonded together and said integrator feedback coil is located centrally between said two wafers to provide symmetric actuation.

15. The accelerometer of claim 13 with said external feedback circuitry driving said main feedback coil and said integrator feedback coil in a transconductance configuration.

16. The accelerometer of claim 12 having an additional electromagnetic actuator to provide a calibration input.

* * * * *